W. E. PHILLIPS.
CAMERA ATTACHMENT.
APPLICATION FILED DEC. 27, 1917.

1,307,598.

Patented June 24, 1919.

Inventor:
W. E. Phillips
by Egerton R. Case
Atty.

UNITED STATES PATENT OFFICE.

WILLIS E. PHILLIPS, OF COLLBRAN, COLORADO, ASSIGNOR TO DOUGLAS HENRY SAVILLE, OF TORONTO, CANADA.

CAMERA ATTACHMENT.

1,307,598.             Specification of Letters Patent.    Patented June 24, 1919.

Application filed December 27, 1917. Serial No. 209,123.

*To all whom it may concern:*

Be it known that I, WILLIS E. PHILLIPS, a citizen of the United States, residing at Collbran, in the county of Mesa, State of Colorado, one of the United States of America, have invented certain new and useful Improvements in Camera Attachments, of which the following is a specification.

This invention relates to improvements in camera attachments, and relates more particularly to certain improvements in the attachment patented to me April 24, 1906, Number 818,553, and the principal objects of my invention are: (*a*) to provide an improved system of control for various shaped prisms, particularly a pair of different sizes and shaped so as to give the largest possible square field on the screen without loss of power, so as to permit of the use of the attachment with cameras using standard lenses, and (*b*) to utilize said system of control to enable me to successfully use only one prism in order to provide for the production of photographs of individuals distorted to the extent of caricature. Various other objects of my invention will appear in the following specification, in which I shall describe a preferred manner of pivoting and mounting the prisms, in combination with a camera lens.

Figure 1:
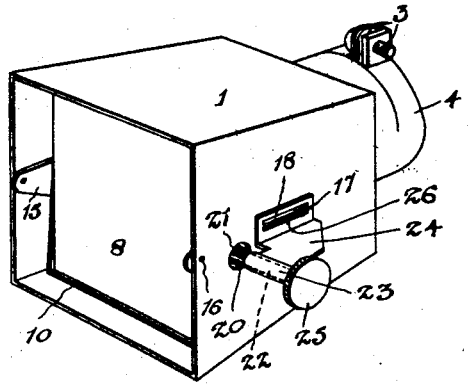
Figure 2:
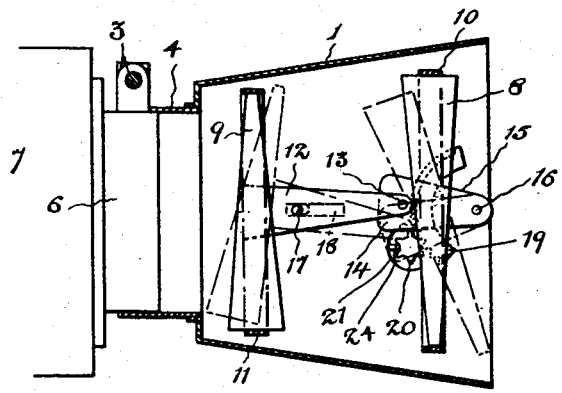
Figure 3:
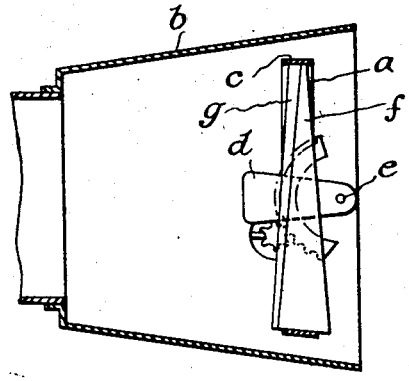

Figure 1 is a perspective view of the preferred form of attachment. Fig. 2 is a vertical longitudinal section through the attachment connected to a conventional type of camera showing the prisms and certain of their supporting and control mechanism in elevation, and Fig. 3 is a vertical longitudinal section through the attachment showing, in end elevation, one prism as well as certain of its supporting and controlling mechanism.

In the drawings, like characters of reference refer to the same parts.

The function performed by the prisms disclosed in this present application is that performed by the prisms disclosed in my said patent; that is, when using the two prisms, I leave one dimension unaltered and extend or contract the other dimension at will; thereby reproducing a photograph which gives the same proportionate impression of the subject-matter photographed as is obtained by the eye when viewing the original.

At the outset, it must be understood that though I prefer to use a container or casing within which to house the mechanism to afford protection and support therefor, it will be understood that in reality any open framework may be used which will carry the prisms and gear.

This invention, whether one or two prisms be used, depends for its maximum efficiency entirely upon the fact that its prisms or prism intercept all the light-rays which can pass through the camera lens.

One of the inherent defects in the attachment disclosed in the said patent resides in the fact that it is impossible for me to secure therewith a wide enough field of vision to permit of the successful use of the attachment with cameras using standard lenses. The said patented attachment has to use a lens focus of seventeen inches, and requires a bellows extension not found on ordinary cameras, to produce a picture four by five inches. Now by reason of the particular manner in which the prisms are mounted, I am enabled to dispense with any light-excluding features in the supports for the prisms and secure the advantages before enumerated. The fact that the prisms in the said patent are equal in size and concentrically mounted in a cylindrical case or housing is the cause of the defects before stated.

In the following specification, I shall illustrate and describe a suitable construction for maintaining a pair of conventional prisms in coöperative position to effect the objects in view, and shall also illustrate and describe the use of only one prism for the purpose of distorting an image to the extent of caricature.

The preferred shape of prism used to secure the maximum advantages of my invention is that of a square, though it is within the terms of my claims to eccentrically mount prisms of any shape, even though the use of the prisms other than square in shape will not secure a field as wide as it is possible to obtain. But it is conceivable that under some circumstances, the scope of field may not be of any immediate consideration.

To get the best results, the path of the utilized light-rays is correctly assumed to be that of a square pyramid, and therefore I prefer to use one or more square prisms preferably having a pitch of twelve degrees.

It will be observed that my attachment can be cheaply made; weighs very little, and that the same can be readily applied to the lens-tube or barrel of an ordinary camera without requiring any change or alteration therein.

In the non-caricaturing use of my attachment, two prisms are used, and it will be noticed that the rear prism is smaller than the front prism the relative sizes of the said prisms coupled with the eccentric mounting therefor, enables me to intercept all the light-rays coming to them in pyramidal or conical form, and to secure the maximum field.

The angle to which the pair of prisms can be turned is a factor in the power of the instrument. Now by reason of the fact that the rear prism is of smaller area than the front prism, this enables me to secure the widest possible efficient angular movement of these parts to effect the object in view, without having to place the prisms farther apart. If both prisms were the same size, it will be clear that the angular movement thereof would not have the same range as provided for by the different-size prisms. Since power and field are opposing propositions, it is therefore self-evident that by reason of the combination disclosed, I am enabled to secure the maximum power and field, since the distance separating the prisms from the camera lens is such as to insure the realization of the objects.

1 is the preferred form of container or housing, and the same is shaped like a frustum of a pyramid. The rear end of the said container or housing is provided with a coupling sleeve 4 designed to be placed upon the lens-tube 6 of any conventional form of camera 7. Any suitable clamping means 3 is carried by the coupling-sleeve 4 so as to permit the attachment to be fixed in the position desired. Within the container or housing 1 is a pair of transparent prisms 8 and 9, of different sizes. These prisms are disposed in opposite relationship, that is to say, the base of one prism extends in the direction of the apex of the other prism. These prisms are eccentrically mounted within the said container or housing, and the preferred manner of so mounting is to provide frames 10 and 11 which carry said prisms. The frame 11 is provided at each side with spring-arms 12 which are detachably pivoted by the pins 13 in the rearward extensions 14 of the spring-arms 15, which latter arms are carried by the frame 10. The spring-arms 15 are detachably pivoted by the pins 16 in the sides of the container or housing 1, as are also the spring-arms 12 by reason of the pins 17. The said pins 17 are shown as mounted to move in slots 18 formed in the sides of said container or housing, as this permits the rear prism to be drawn forward slightly and tilted: this is a feature which adds slightly to the field, but is not vital. In other words, the arms 12 may be pivoted in the sides of the container or housing 1 in the same manner as are the arms 15.

As shown in Fig. 2, said prisms are spaced apart, the smaller prism near the rear end of the container or housing, and the larger prism near the front end thereof. When they are disposed in parallelism, as shown by full lines in Fig. 2, the refraction produced by the front prisms 8 is corrected by the second prism 9, wherefore the light-rays strike the camera lens in the same relation as when the prisms are not in place. By tilting the prisms to the same extent from their normal relation to the position shown by dot-and-dash lines, the refraction of the light-rays caused by the prisms will increase the height of the image without affecting the width thereof. By adjusting the prisms in the opposite direction to the position shown by dotted lines, the opposite effect occurs, that is to say, the height of the image will be shortened without increasing width. By turning the attachment on the lens-tube 6 at right-angles, the width of the image can be increased or decreased without any change in height thereof.

The preferred means of adjusting the prisms comprises a toothed-quadrant 19 carried by one of the arms 15 adjacent one of the sides of the container or housing. Meshing with this quadrant is the pinion 20 which operates through a hole 21 formed in one side of the container or housing. This pinion is carried by the spindle 22 held in a suitable bearing 23 carried by a plate 24 suitably connected to one side of the said container or housing. The head 25 carried by the spindle 22 permits of the ready manipulation of the prisms. Although the pins 17 are shown as operating through slots 26 formed in a portion of the plate 24, this construction is not essential.

It will be observed that the mounting and control mechanism for the prisms is beyond the field thereof.

In practice, the camera is focused in the usual manner, and through the mechanism described, adjustment of the prisms will occur until the image upon the ground glass is brought to a precise reproduction of the impression received by the eye when viewing the original. This feature of the invention is particularly useful in protrait photography, as it is a well-known fact that photographic images of many people do not give the ordinary optical impression. This reason is because photographs are a true reproduction of the image as viewed by the lens, and heretofore such fact has not been susceptible to modification by the photographer. The use of this attachment with the two prisms will permit the photographer to make exactly the change that an artist of the best class makes in his drawings or paintings.

Now we will consider the production of photographs distorted to the point of caricature. This caricaturing feature of the invention will most efficiently be put into practice in photographing living creatures or a group thereof. The distortion of the image is a result of the unsymmetrical changes, whereas the corrective use of the instrument already described is the result of symmetrical changes. Of course it will be understood that such unsymmetrical changes can occur at any angle. By pressing inwardly the ends of the spring arms 15, the front prisms can be detached and by manipulating the supporting parts for the prisms, these supporting parts together with both prisms can be withdrawn from the container or housing. The spring arms 15, and the prisms 8 are replaced within the container, and photographs taken, the changes in which are not symmetrical. If desired, after the rear prism has been uncoupled from the front prism, it may be coupled thereto again, in reversed position, and in this case, both prisms will functionate as one.

In Fig. 3, I have shown only one prism a, in use, preferably mounted within a container b, for a reason before set forth. This prism is preferably rectangular in shape, and if it is made oblong in form, that is to say, of greater length in the direction of its axis, than in height, it follows that the container b, when used, will be in cross section shaped like an oblong pyramid. When a frame so shaped is used, it will considerably increase the field in one direction and may be used on cameras using a wide angled lens. This prism may be mounted in any suitable frame c, and this frame is provided with arms d, (only one of which is shown) pivoted to the sides of the container b, by the pins e: this provides for the eccentric mounting of the said prism.

It will be observed that the prism a, is composite, because I have found from exhaustive experiments that a single prism is chromatic, and therefore the light rays delineating the image to be photographed are not uniformly sharp throughout the camera plate when angled. To overcome this difficulty, I combine a crown-prism f of fifteen degrees, for example, with a reversed flint-glass prism g, of five degrees, for example. These prisms are secured together, in reversed arrangement preferably by cementing. The crown-glass prism will have as high a refractive strength as possible, whereas the flint-glass prism will have less refractive strength but greater dispersive power.

Claims:

1. The combination with a camera, and the lens thereof, of a prism; a support therefor adjustably carried by said camera to permit of the change of position of said prism to any degree, supporting members carried one at each side of said prism and pivoted in said support to eccentrically mount said prism, and means for moving said supporting means so as to move said piston through an eccentric path.

2. In a camera, the combination with the lens thereof, and the lens-tube, of a tapered container or housing open at the front and rear ends, the said rear end designed to be carried by said lens-tube; a prism within said container, supporting members carried one at each side of said prism and pivoted in said support to eccentrically mount said prism, and means for moving said supporting means so as to move said prism through an eccentric path.

3. In a camera, the combination with the lens thereof, and the lens-tube, of a container or housing shaped like a frustum of a pyramid, open at the front and rear ends, the said rear end designed to be carried by said lens-tube; a prism rectangular in shape within said container, supporting members carried one at each side of said prism and pivoted in said support to eccentrically mount said prism, and means for moving said supporting means so as to move said prism through an eccentric path.

4. In a camera, the combination with the lens thereof, and the lens-tube, of a container or housing shaped like a frustum of a pyramid, open at the front and rear ends, the said rear end designed to be carried by said lens-tube in such a manner that it may be turned to any degree; a prism rectangular in shape within said container, and means whereby said prism is eccentrically mounted therein to be moved into the desired angle.

5. A camera attachment comprising a tapered container having both ends open, the smaller end formed for connection with the lens-tube of a camera; front and rear prisms within the container of different sizes, and means whereby said prisms are eccentrically movably mounted therein.

6. A camera attachment comprising a tapered container having both ends open, the smaller end formed for connection with the lens-tube of a camera; front and rear prisms within the container of different sizes and rectangular in shape, and means whereby said prisms are eccentrically movably mounted therein.

7. A camera attachment comprising a container shaped like the frustum of a pyramid, having both ends open, the smaller end formed for connection with the lens-tube of a camera; front and rear prisms within the container of different sizes, and means whereby said prisms are eccentrically movably mounted therein.

8. A camera attachment comprising a container shaped like the frustum of a pyramid, having both ends open, the smaller end formed for a connection with the lens-tube of a camera; front and rear prisms within the container of different sizes, and means whereby said prisms are eccentrically removably mounted therein, to be moved in unison.

9. A camera attachment comprising a container shaped like the frustum of a pyramid, having both ends open, the smaller end formed for connection with the lens-tube of a camera; front and rear prisms within the container of different sizes, and rectangular in shape; means whereby said prisms are eccentrically pivoted in said container to be moved in unison, and means positioned at one side of the container to tilt said prisms on their pivots.

10. A camera attachment comprising a container shaped like the frustum of a pyramid, having both ends open, the smaller end formed for connection with the lens-tube of a camera; front and rear prisms within the container of different sizes; an arm positioned at each side of said prisms and projecting behind the same; means whereby the arms carried by the rear prisms are eccentrically pivoted to the arms of said front prism; means whereby the arms of said front prism are eccentrically pivoted in the sides of said container; a toothed-quadrant carried by one of the arms of said front prism; a pinion meshing with said toothed-quadrant, and a spindle carrying said pinion and supported by said container to project therebeyond.

11. A camera attachment comprising a tapered container having both ends open, the smaller end formed for connection with the lens-tube of a camera; front and rear prisms within the container of different sizes, and means to simultaneously eccentrically move said prisms to corresponding angular adjustments, and to permit individual adjustment of the prisms and their removal from the container.

12. A camera attachment comprising a tapered container having both ends open, the smaller end formed for connection with the lens-tube of a camera, a prism; supporting members carried one at each side of said prism and pivoted in said container to eccentrically mount said prism, and means for moving said supports so as to move said prism through an eccentric path.

13. A camera attachment comprising a container shaped like the frustum of a pyramid, having both ends open, the smaller end formed for connection with the lens-tube of a camera; a square prism therein, and means whereby said prism is removably eccentrically mounted within said container in such a manner that it may be adjusted into any required angular position.

14. The combination with the lens-tube of a camera, of a support rotatably associated with said lens-tube, and a light-refracting device including a prism, and means whereby said prism is eccentrically carried by said support and moved through an eccentric path independently of any movement of said support.

WILLIS E. PHILLIPS.

Copies of this patent may be obtained for five cents each, by addressing the "Commissioner of Patents, Washington, D. C."